(12) United States Patent
Tse

(10) Patent No.: US 6,193,178 B1
(45) Date of Patent: Feb. 27, 2001

(54) WASTE DISPOSAL APPARATUS

(76) Inventor: Steven Tse, c/o Percy International Patent Corp., P.O. Box 1-79, Taipei (TW)

( * ) Notice: Subject to any disclaimer, the term of this patent is extended or adjusted under 35 U.S.C. 154(b) by 0 days.

(21) Appl. No.: 09/290,860

(22) Filed: Apr. 14, 1999

(51) Int. Cl.⁷ .................................................. B02C 19/00
(52) U.S. Cl. .............. 241/79.1; 241/152.2; 241/DIG. 38
(58) Field of Search ............................... 241/79.1, 152.2, 241/DIG. 38, 60

(56) References Cited

U.S. PATENT DOCUMENTS 3,910,775 * 10/1975 Jackman ............................... 241/79.1
5,829,691 * 11/1998 Gaudin ................................. 241/79.1

* cited by examiner

Primary Examiner—Mark Rosenbaum

(57) ABSTRACT

A waste disposal apparatus is disclosed. The apparatus comprises a crushing device for crushing the waste; a ripping device for ripping the waste; a sieving device having an upper mesh and a lower mesh for sieving out the larger waste blocks and the smaller waste blocks respectively by means of vibrating; an initial separation device for sieving out the smaller waste blocks separated from the lower mesh by employing a number of gates and utilizing the fact that different kinds of waste are different in specific gravity and thus having different immersion depth in the water; a cutting device for cutting the waste blocks with lower specific gravity; an advanced separation device for further sieving out the cut waste pieces; and a strainer device for sieving out the fined waste. By utilizing this apparatus, the purposes of saving power, reducing operation and maintenance costs, and lowering the failure times in a waste disposal process are realized.

31 Claims, 8 Drawing Sheets

WASTE DISPOSAL APPARATUS

BACKGROUND OF THE INVENTION

1. Field of the Invention

The present invention relates to a waste disposal apparatus, and more particularly to a waste disposal apparatus comprises a crushing, a ripping, a sieving, an initial separation, a cutting, an advance separation, and a strainer devices for classifying a variety of waste.

2. Description of Related Art

Waste is frequently produced in our daily life and in the industry. Further, we are bothered to dispose the waste, especially non-biodegradable materials such as plastic. Typically, a toxic exhaust is possibly produced by burning the waste in the incinerator. In addition, the plastic is subjected to form a concreted mass after burning such that it is hard to degrade. A cracking process, such as a plasma cracking process, for disposing waste is developed recently. This is an improvement over the above burning technique. However, it is still impossible of processing waste comprising stones, glass, metal cans, and chemicals. It is desirable to classify waste in order to recycle it or further incinerate or crack it.

SUMMARY OF THE INVENTION

It is an object of the present invention to provide a waste disposal apparatus for offering the advantages of saving power, reducing operation and maintenance costs, and lowering the failure times.

The advantages of the present invention are realized by providing a waste disposal apparatus comprising a crushing device for crushing the waste; a ripping device coupled to the crush device for ripping the waste; a sieving device coupled to the ripping device having an upper mesh and a lower mesh for sieving out the larger waste blocks by horizontally vibrating the upper mesh and further sent to a tank; an initial separation device for sieving out the smaller waste blocks separated from the lower mesh by utilizing the fact that different kinds of waste are different in specific gravity and thus having different immersion depth in the water; a cutting device for cutting the waste blocks with lower specific gravity; an advanced separation device for further sieving out the waste pieces sent from the cutting device again by utilizing the same fact as the initial separation device; and a strainer device for sieving out the fined waste.

The above and other objects, features and advantages of the present invention will become apparent from the following detailed description taken with the accompanying drawings.

DETAILED DESCRIPTION OF PREFERRED EMBODIMENTS

Figure 1:
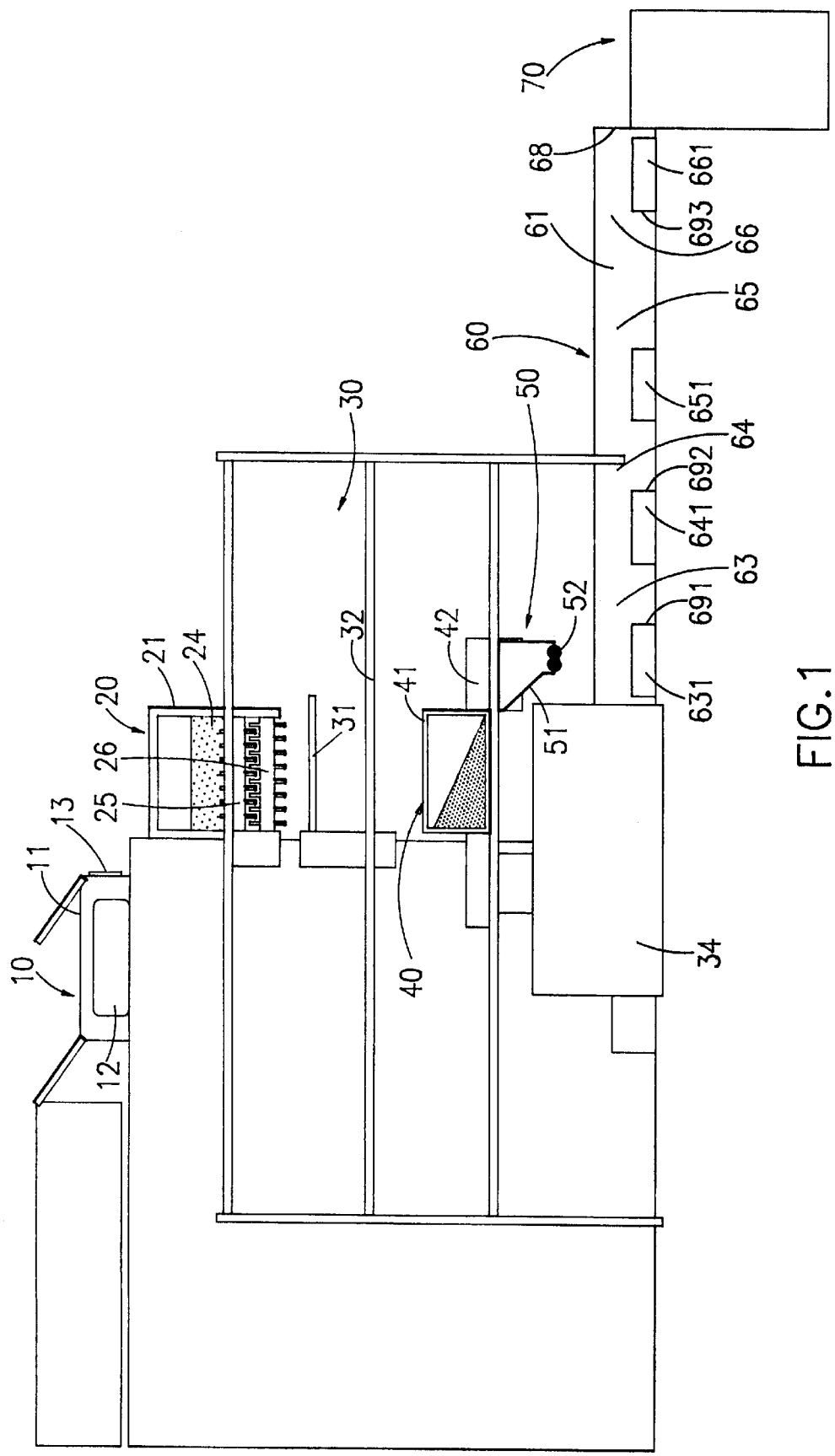
FIG. 1 is side view of a waste disposal apparatus constructed in accordance with the present invention.
Figure 2:
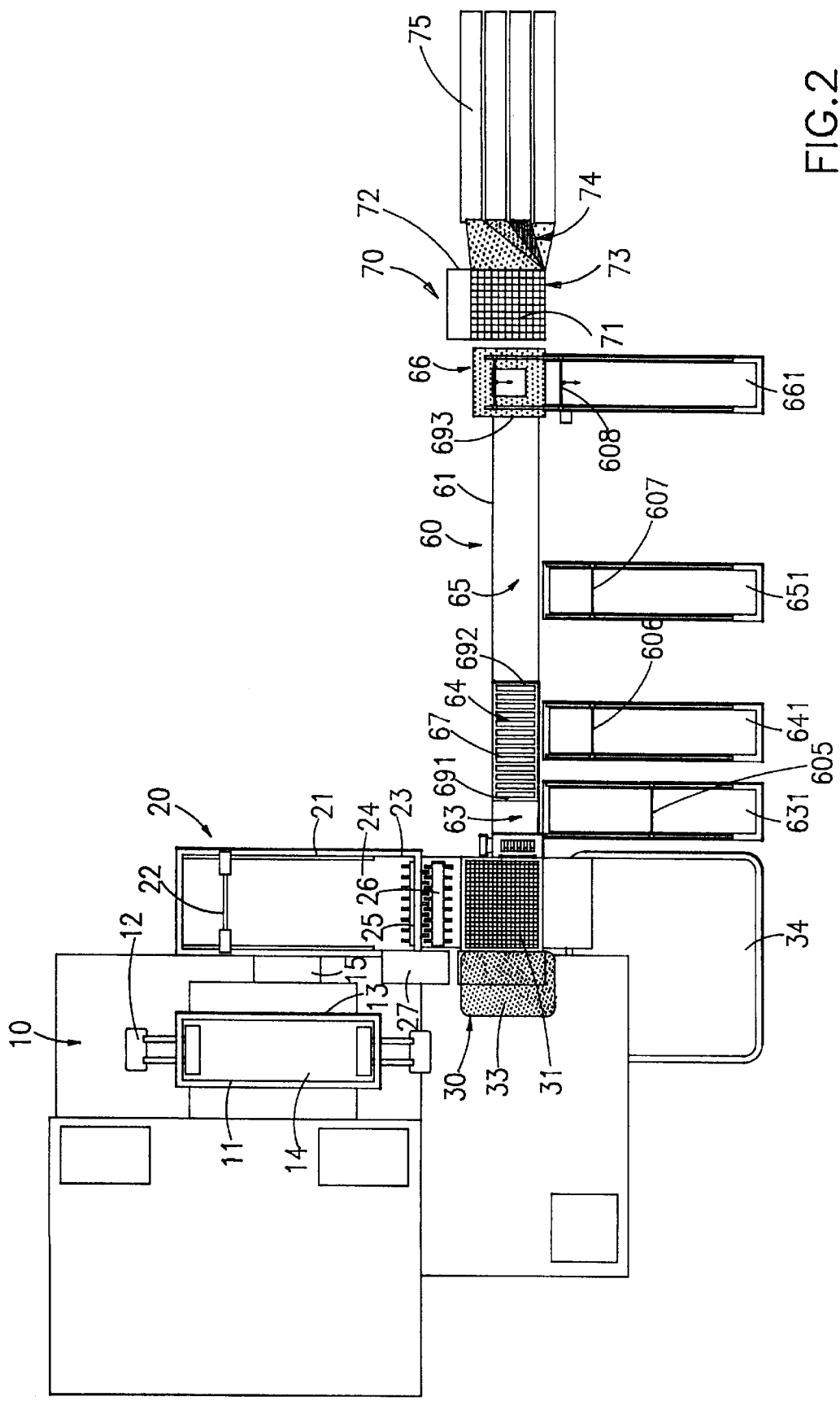
FIG. 2 is a fragmentary view of FIG. 1.
Figure 3:
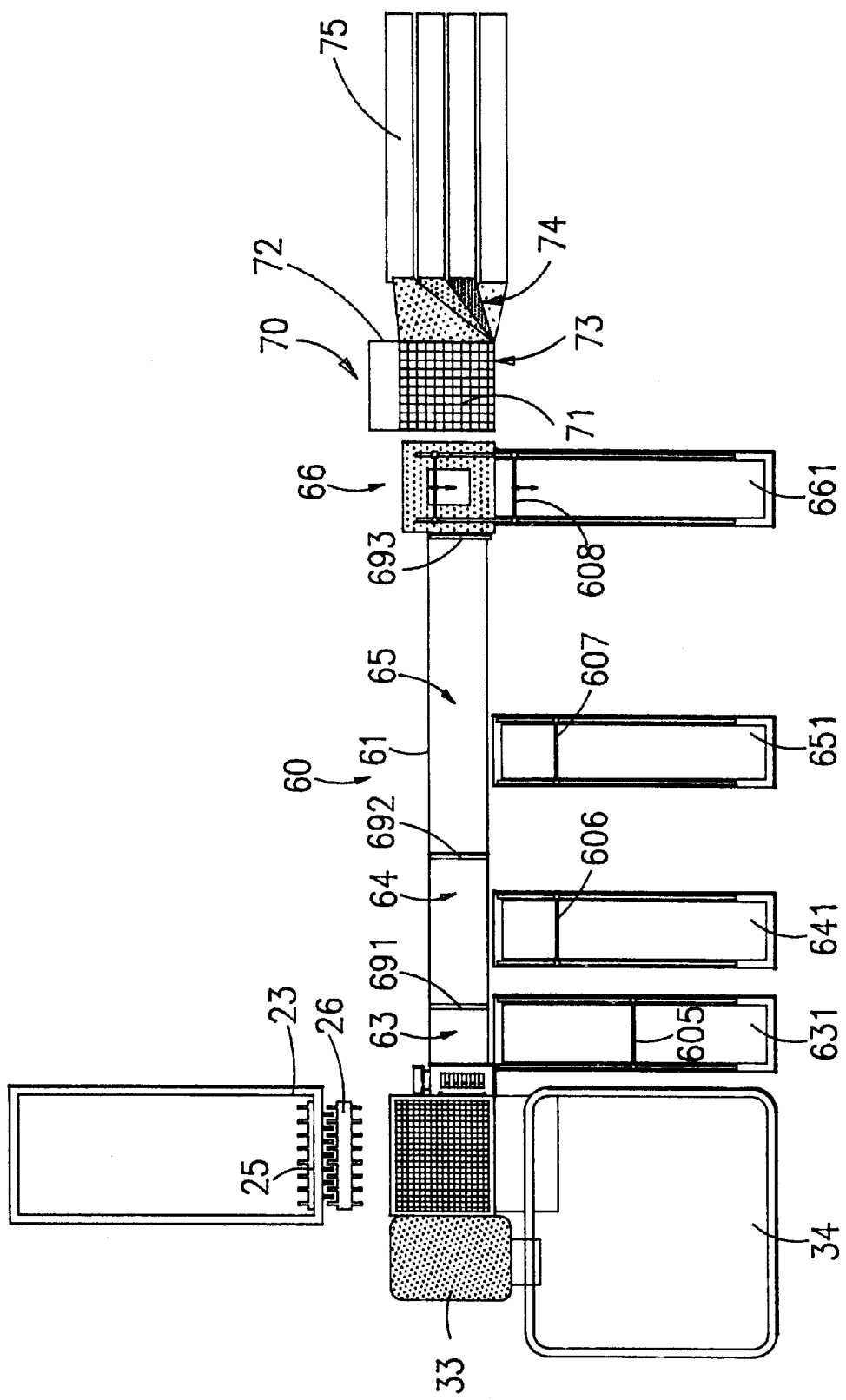
FIG. 3 is another fragmentary view of FIG. 1.
Figure 4:
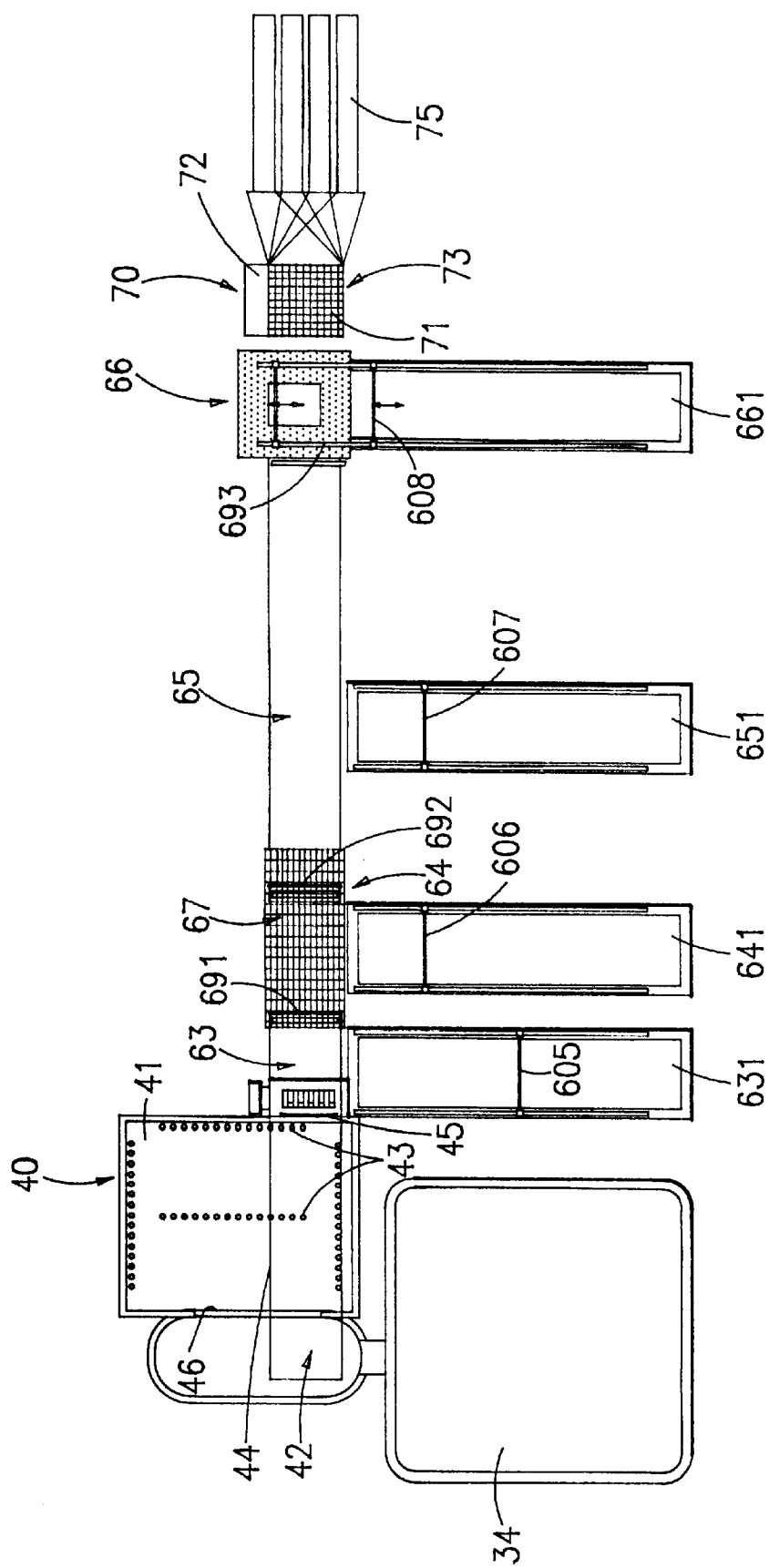
FIG. 4 is a further fragmentary view of FIG. 1.

Referring to FIGS. 1–4, there is shown a waste disposal apparatus. The apparatus comprises a crushing device 10, a ripping device 20, a sieving device 30, an initial separation device 40, a cutting device 50, an advanced separation device 60, and a strainer device 70.

The crushing device 10 functions as crushing the waste (not shown). The crushing device 10 comprises a tank 11 for receiving the waste; a microcomputer-controlled hydraulic press 12 mounted in the tank 11 for crushing the waste from two opposite sides of the tank 11 toward the center thereof; a gate 13 provided on a front side of the tank 11; a movable pusher 14 is mounted in the tank 11 for pushing the crushed waste out of the tank 11 through the gate 13; and a slope 15 coupled to the gate 13 such that the waste is capable of being slid to a tank 21 of the ripping device 20. It is noted that the pusher 14 is a device coupled to, for example two horizontal beams each travelling on a track (see FIG. 7). Preferably, the capacity of the tank 11 is two to three trucks dumping of waste.

The ripping device 20 is positioned to be coupled to and lower than the crushing device 10 for ripping the waste. The tank 21 of the ripping device 20 is generally an elongated structure. A movable ripper-like pusher 22 is mounted on the top of the tank 21 for pushing the waste to an outlet 23 located on an end of the tank 21. A slope 24 is inclined approximately at an angle 30° with respect to a roller 25 located on the side of the outlet 23. The surface of the roller 25 is mounted with a number of spaced positioned sharp pins for ripping the waste before sending the waste to a ripper 26 located below the roller 25. The ripper 26 is a pair of rollers each mounted with a number of spaced positioned sharp pins in which the turning direction of one roller is opposite to that of the other roller for ripping the waste prior to being sent to the sieving device 30. The ripper 26 is rotated by a drive source 27.

The sieving device 30 is positioned to be coupled to and lower than the ripping device 20. The sieving device 30 has an upper mesh 31 with a diameter of 20 cm and a lower mesh 32 with a diameter of 10 cm. Both the upper mesh 31 and the lower mesh 32 are inclined approximately at an angle of 30° with respect to the horizontal plane. The ripped waste is sent to the upper mesh 31 because the upper mesh 31 is located below the ripper 26. A driver device 33 is used to vibrate the upper mesh 31 and the lower mesh 32. As a result, the larger waste blocks (e.g., large plastic bags, elongated bodies, and sticky sheets of paper, etc.) are left on the upper mesh 31 for being sent to the tank 34, while the smaller waste blocks are sieved out from the upper mesh 31 and left on the lower mesh 32 for being sent to the initial separation device 40.

The initial separation device 40 functions as sieving out the smaller waste blocks separated from the lower mesh 32 by utilizing the fact that the waste blocks with higher specific gravity being immersed deeper than the waste blocks with lower specific gravity in the water. The initial separation device 40 comprises a large water tank 41 and a reservoir 42 positioned adjacently to and by a predetermined distance lower than the water tank 41 for holding the overflow of the water tank 41. The water tank 41 is a cubic structure in which the bottom surface is inclined at an angle 30° with respect to the horizontal plane. A number of vertical spaced water supply lines 43 is provided on the inside of the water tank 41. The water tank 41 is full of water because a pump (not shown) is continuously supplying water when the initial separation device 40 is in use. An outlet 46 is provided on the side of the higher bottom surface portion of the water tank 41. An opening 44 is provided on a top of the outlet 46. The opening 44 is positioned lower than the water surface of the tank 41 by an approximate 10 cm for allowing the floated waste flowed to the reservoir 42. Another opening 45 is provided on the side of the lower bottom surface portion of the water tank 41 for allowing the heavier or immersed waste flowed to the reservoir 42 for facilitating the cutting process as detailed below. The initial separation device 40 is designed to further separate the waste, such as lighter or smaller waste, sent from the lower mesh 32. It is designed that approximately 70% of the waste, such as the compact containers, rice containers, and PVC bags, etc., is separated after the sieving and the initial separation processes. As stated above, other waste is flowed to the reservoir 42 via the opening 44.

The cutting device 50 functions as cutting the waste blocks with lower specific gravity. A funnel-like member 51 is provided below the opening 45 of the water tank 41 for allowing the waste slid to the cutting device 50. The input speed of the waste and the throughput of the cutting device 50 are controlled by a microcomputer (not shown) mounted therein. The cutting device 50 comprises a pair of cylindrical roller 52 each mounted with a number of spaced positioned sharp pins in which the turning direction of one roller 52 is opposite to that of the other roller 52.

The advanced separation device 60 is positioned below the cutting device 50. The advanced separation device 60 is an elongated waterway 61 in which the flow is smooth and slow. The advanced separation device 60 functions as receiving the waste pieces sent from the cutting device 50. The length of the waterway 61 is approximately 25 to 35 m. The waste outlet (not shown) of the cutting device 50 is approximately eight meters from the front end and above the waterway 61. The advanced separation device 60 comprises a first region 62, a second region 63, a third region 64, a fourth region 65, and a fifth region 66 arranged from the front end of the waterway 61 to the rear end thereof. A separation plate 691 is inserted between the second region 63 and the third region 64, a separation plate 692 is inserted between the third region 64 and the fourth region 65, and a separation plate 693 is inserted between the fourth region 65 and the fifth region 66. A high pressure hose functions as scattering the waste floated between the second region 63 and the third region 64. In general, the flow is smooth and slow after flowing approximately seven to eight meters in the first region 62. It is noted that the second region 63 is located approximately three meters from the front end of the waste outlet of the cutting device 50, further four meters is the third region 64, further four meters is the fourth region 65, and finally further ten meters is the fifth region 66 in which the water flow is smooth and slow. It is found that a number of small waste pieces (e.g., plastic cards, light particles, or PVC particles) are floated. Thus, an opening 68 is provided below the water surface of the waterway 61 by an approximate 10 cm distance for allowing such waste to flow out of the waterway 61. It is noted that a certain amount of organic substance are mixed in the waste. The heavier waste, such as stones, glass, etc., are immersed in the second region 63. Additionally, an adjustable opening 68 is provided in a bottom surface of an end of the waterway 61 for allowing water to flow to a top of the strainer device 70 such that fined particles in the water will be separated by the strainer device 70.

Preferably, the strainer device 70 is located below the waterway 61 by a half meter. The strainer device 70 is a multilevel steel structure having a number of meshes 71 (preferably the number is four) each disposed on a level thereof. The top (i.e., the first) level mesh has the largest diameter, the second level mesh has the next largest diameter, and so on. Each mesh is vibrated in a different predetermined speed by a driver device 72. Alternatively, all meshes are vibrated in the same speed. As such, particles in the water will be sieved out and sent to a storage tank 75 through a slope 74 coupled to an end of each mesh 71. A high pressure water pump 73 is provided for cleaning impurities left on the meshes 71 for preventing such impurities from blocking the meshes 71. The separated waste in the strainer device 70 is mostly of organic substance such that is capable of being used as fertilizer, fodder, or fish feeding.

Figure 5:
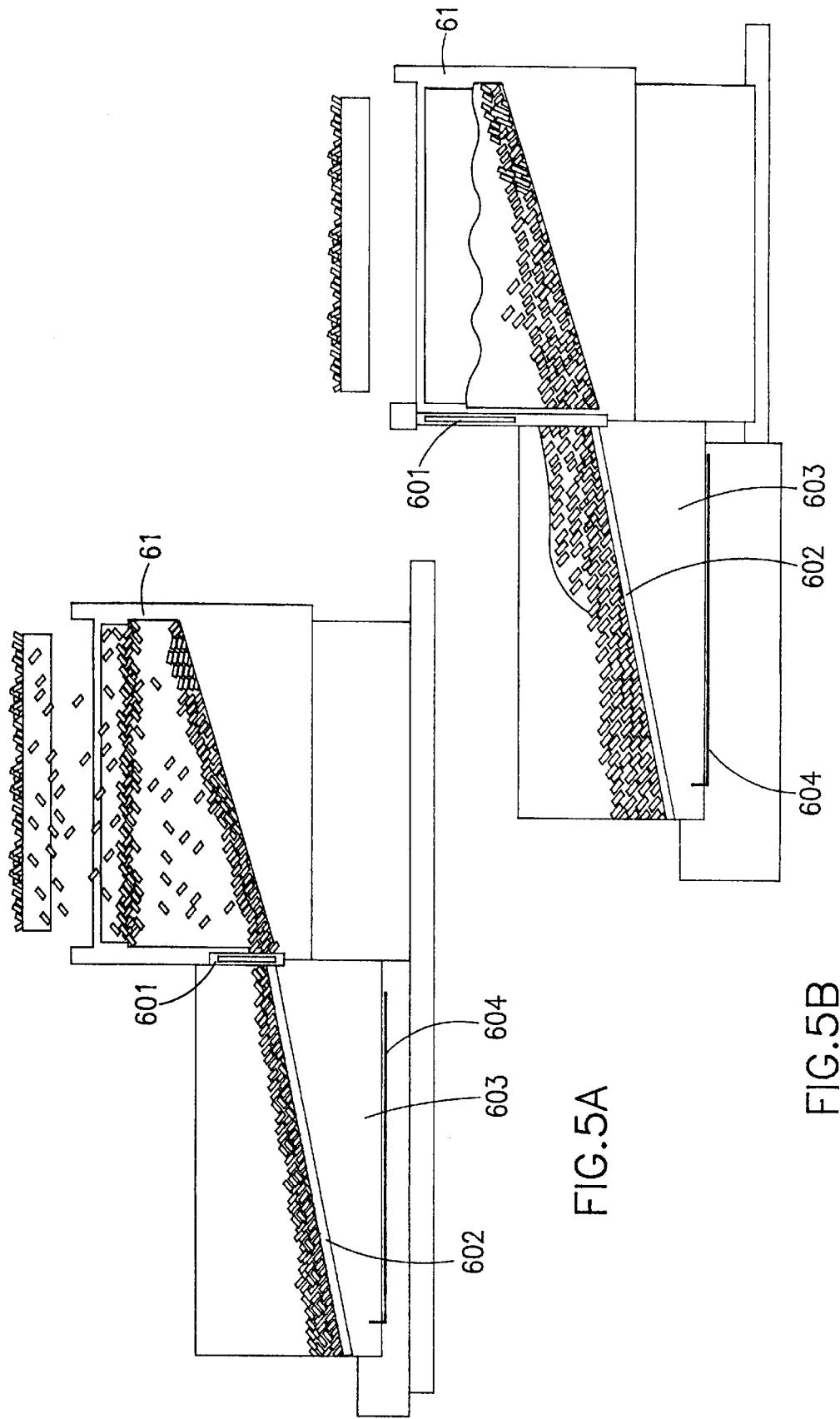
FIGS. 5A, 5B, and 6 schematically show the waste classifying operation of advanced separation device of the present invention respectively.
Figure 6:
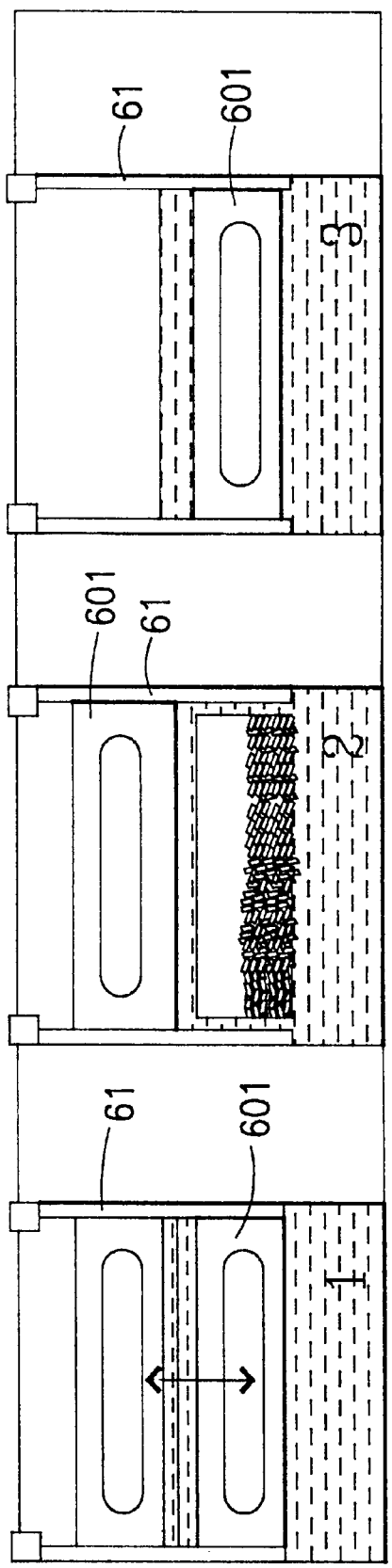

Referring to FIGS. 1–6, particularly to FIGS. 5A, 5B, and 6, a waste classifying operation of the advanced separation device 60 is illustrated. The height of the separation plate 691 is approximately one fourth of the height of the waterway 61, the height of the separation plate 692 is approximately one half of the height of the waterway 61, and the height of the separation plate 693 is approximately three fourth of the height of the waterway 61. It is noted that the waste pieces are floated or immersed in the waterway 61 and the flow is slow. Thus, when the waste pieces are flowed through the regions 63, 64, 65, and 66, based on the specific gravity thereof (i.e., the higher of the specific gravity the heavier of the waste pieces), the heaviest waste pieces will be sunk into the second region 63, the second heaviest waste pieces sunk into the third region 64, the third heaviest waste pieces sunk into the fourth region 65, and the lightest waste pieces floated on the fifth region 66. At this point, a gate 601 on one end of the waterway 61 is closed. For processing the waste pieces, the waste dumping and water supply will be paused temporarily and subsequently open the gate 601. As noted, the above procedure is controlled by a computer. Once the gate 601 is open, the classified waste, temporarily stored in the regions 63, 64, 65, and 66, will be pushed to respective tanks 631, 641, 651, and 661 thereof by the flowing force of water caused by the inclined bottom surface of the waterway 61 (e.g., inclined at an angle 30° with respect to the horizontal plane). A slant separation plate 602 is provided below the tanks 631, 641, 651, and 661 for separating the waste pieces from dirty water. The dirty water is flowed to the bottom of the waterway 61, i.e., a sewage tank 603. The dirty water in the sewage tank 603 is further sent to a sewage disposal plant (not shown) for treatment through a drain 604. The gate 601 is closed again once the waste pieces are sent to each tank 631, 641, 651, and 661 completely.

Figure 7:
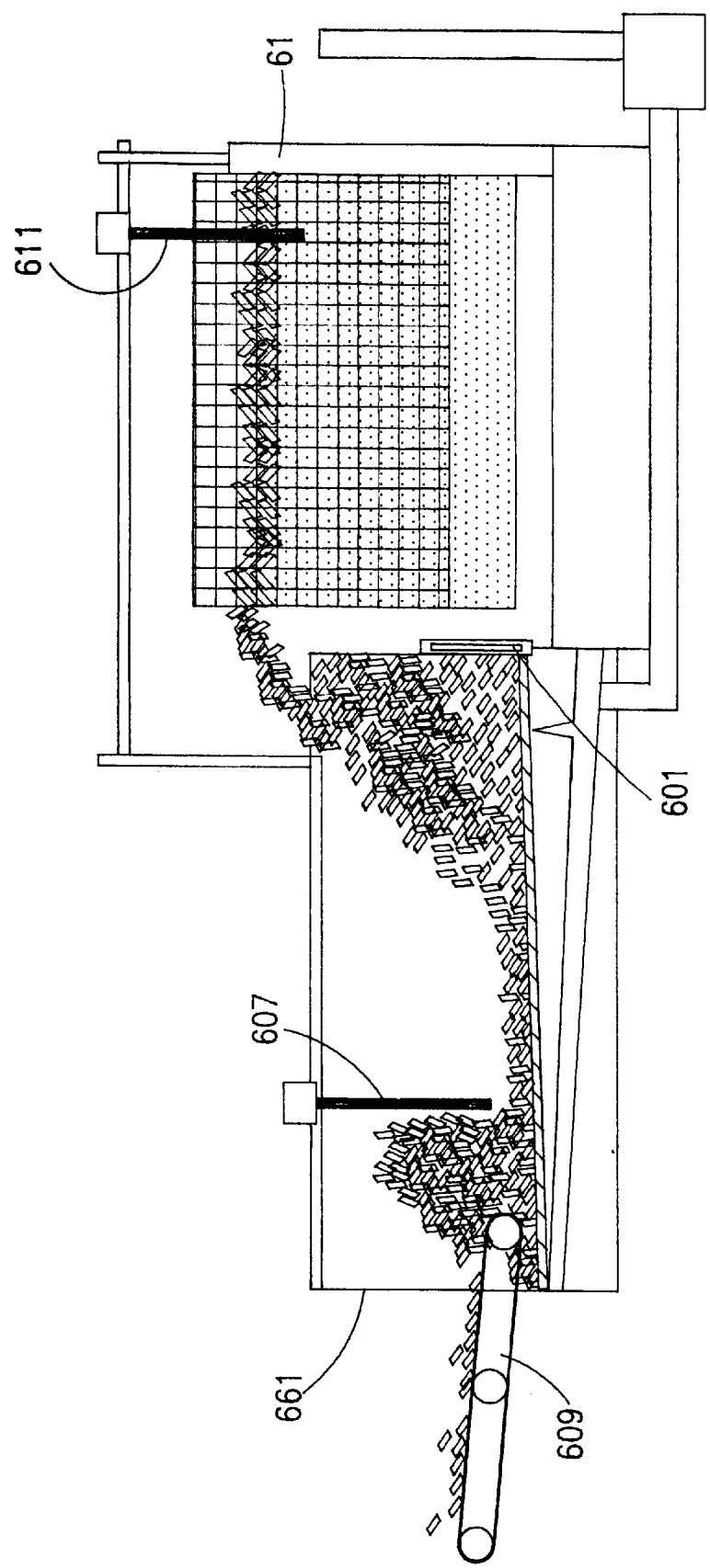
FIG. 7 schematically shows the collecting process of the advanced separation device of the present invention.

At FIG. 7, the collecting process of the advanced separation device 60 is illustrated. A number of movable pushers 605, 606, 607, and 608 are provided in the tanks 631, 641, 651, and 661 respectively for pushing the waste stored therein to a conveyor 609 for being carried to a truck for transporting to a known place for further treatment. It is noted that almost all waste pieces are floated on the fifth region 66 located at the end of the waterway 61. As such, a ripper 611 is employed to push the floated waste to the tank 661. This is the only difference between the fifth region 66 and other regions 62, 63, 64, and 65. Further, the gate 601 is still functioned in the tank 661 and the fifth region 66.

Figure 8:
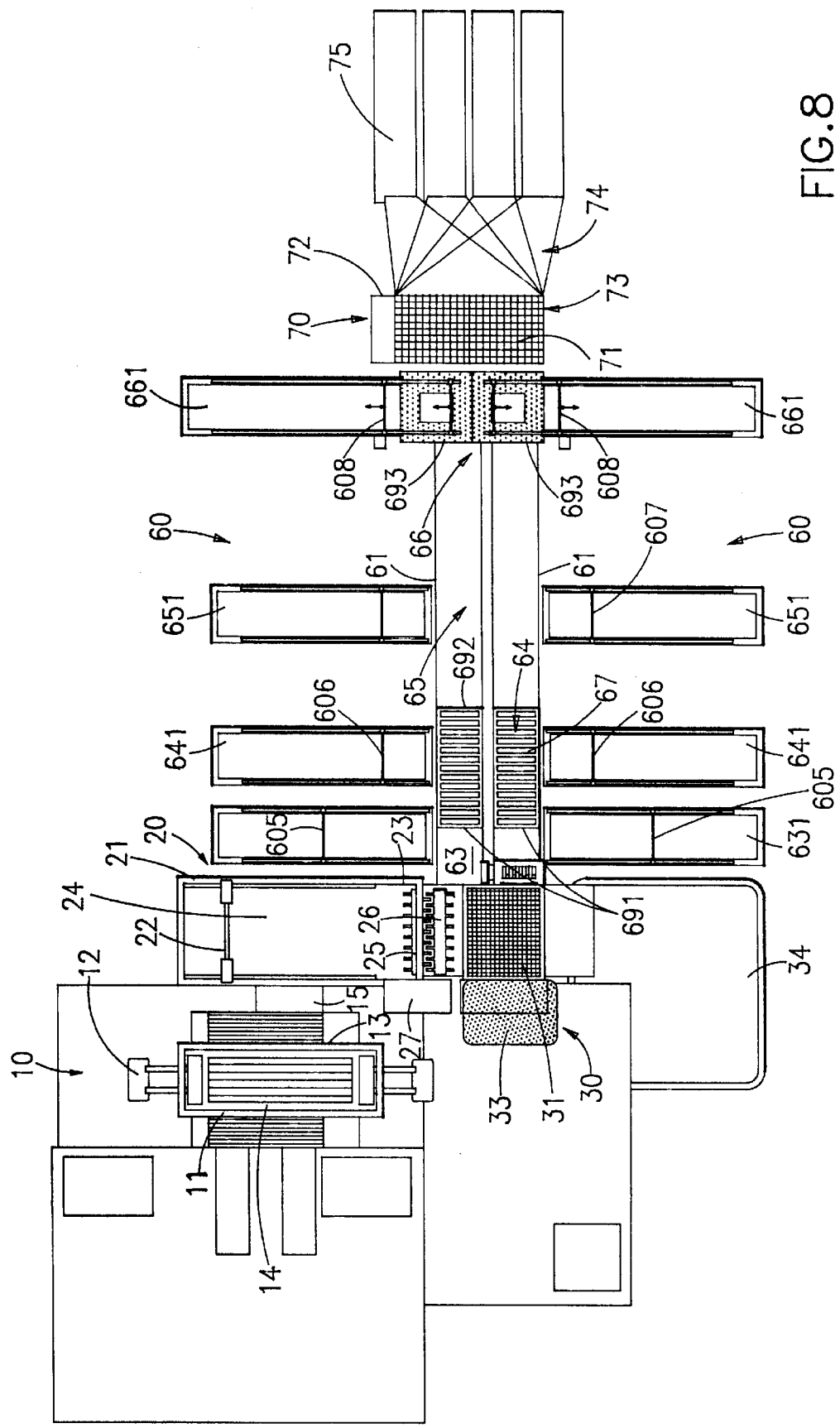
FIG. 8 is a side view illustrating the double waterway feature of the present invention.

At FIG. 8, the double waterway feature of the waste disposal apparatus is illustrated. Such design, as claimed to be one of the novel features of the present invention, is aimed at keeping the apparatus from shutting down accidentally. In other words, this design is more fault-tolerant.

While the invention herein disclosed has been described by means of specific embodiments, numerous modifications and variations could be made thereto by those skilled in the art without departing from the scope of the invention set forth in the claims.

What is claimed is:

1. A waste disposal apparatus comprising:
a crushing means for crushing the waste comprising a waste tank, and a hydraulic press mounted in the waste tank;
a ripping means for ripping the waste including a tank and a slope positioned to be coupled to and lower than the crushing means;
a sieving means for sieving the waste coming from the ripping means having an upper mesh and a lower mesh for sieving out a plurality of larger waste in the upper mesh and leaving a plurality of smaller waste in the lower mesh;
a initial separation means for sieving out the smaller waste blocks separated from the lower mesh comprising a water tank having a plurality of water pipes provided therein and a reservoir;
a cutting means for cutting the waste blocks positioned below the water tank having a finnel-like member provided below an opening of the water tank for allowing the waste slid to the cutting means, and a pair of cylindrical rollers each mounted with a number of sharp pins in which a turning direction of one roller is opposite to that of the other roller;
an advanced separation means for receiving and separating the waste pieces sent from the cutting means positioned below the cutting means comprising a waterway including a first region having a coupled water storage, a second region having a coupled tank, a third region having a coupled water storage, a third region having a coupled water storage, a fourth region having a coupled water storage, and a fifth region having a coupled water storage arranged from a front end of the waterway to a rear end thereof in which a first separation plate is inserted between the first region and the second region, a second separation plate is inserted between the second region and the third region, a third separation plate is inserted between the third region and the fourth region, and a fourth separation plate is inserted between the fourth region and the fifth region; and each separation plate is different from the other in height; and
a strainer means for separating fined particles in the water located below an end of the waterway of the advanced separation means including a multilevel structure having a number of meshes each disposed on a level thereof, and a driver means for vibrating the multilevel structure in order to sieve out the waste.

2. The apparatus of claim 1, wherein the hydraulic press is operated to crush the waste from two opposite sides of the waste tank toward the center thereof.

3. The apparatus of claim 1, wherein the hydraulic press is a microcomputer-controlled means.

4. The apparatus of claim 1, wherein a gate is provided on a front side of the waste tank, a movable pusher is mounted in the waste tank for pushing the crushed waste out of the waste tank through the gate; and a slope is coupled between the waste tank and the ripping means.

5. The apparatus of claim 4, wherein the pusher is coupled to two horizontal beams each travelling on a track.

6. The apparatus of claim 1, wherein the water tank is generally an elongated structure having a movable ripper-like pusher mounted on a top thereof for pushing the waste to an end outlet thereof.

7. The apparatus of claim 1, wherein a bottom surface of the slope of the ripping means is inclined at an angle 30° with respect to a horizontal plane.

8. The apparatus of claim 1, wherein a pair of rollers each mounted with a number of sharp pins is positioned on an outlet side of the slope for pushing the waste to the ripping means located below the rollers in which a turning direction of one roller is opposite to that of the other roller.

9. The apparatus of claim 8, wherein the sharp pins are spaced positioned in a circumferential surface of each roller for ripping the waste prior to being sent to a ripper.

10. The apparatus of claim 9, wherein the ripper is actuated by a drive source.

11. The apparatus of claim 1, wherein the upper mesh and the lower mesh are inclined approximately at an angle of 30° with respect to the horizontal plane.

12. The apparatus of claim 1, wherein the upper mesh has a diameter of 20 cm and the lower mesh has a diameter of 10 cm.

13. The apparatus of claim 1, wherein the water tank is a cubic structure in which a bottom surface thereof is inclined at an angle 30° with respect to the horizontal plane.

14. The apparatus of claim 1, wherein an outlet is provided on a side of a higher bottom surface of the water tank in which a first opening is provided on a top of the outlet positioned lower than a water surface of the tank for allowing a floated waste flowed to the reservoir, and a second opening is provided on a side of a lower bottom surface of the water tank for allowing an immersed waste flowed to the reservoir.

15. The apparatus of claim 1, wherein the waterway is elongated in shape having a length approximately 25 to 35 meters.

16. The apparatus of claim 1, wherein a waste outlet of the cutting means is approximately eight meters from a front end of the waterway and above the waterway, and the second region is located approximately three meters from the front end of the waste outlet of the cutting means.

17. The apparatus of claim 1, wherein a high pressure hose is provided for scattering the waste floated between the second region and the third region.

18. The apparatus of claim 1, wherein an opening is provided below a water surface of the waterway by an approximate 10 cm distance.

19. The apparatus of claim 1, wherein an adjustable opening is provided in a bottom surface of the end of the waterway for allowing water to flow to a top of the strainer means.

20. The apparatus of claim 1, wherein the strainer means is located below the waterway by a half meter.

21. The apparatus of claim 1, wherein the strainer means is a multilevel steel structure including four meshes each disposed on a level of the strainer means.

22. The apparatus of claim 21, wherein the meshes are tapered in diameter from a top mesh to a bottom mesh.

23. The apparatus of claim 21, wherein each mesh is vibrated in a predetermined speed by the driver means.

24. The apparatus of claim 23, wherein a high pressure water pump is provided for cleaning small piece of waste left on the meshes for preventing from blocking the meshes.

25. The apparatus of claim 23, wherein a slope is provided in an end of each mesh for sending the waste to a storage tank.

26. The apparatus of claim 1, wherein a height of the second separation plate is approximately one fourth of a height of the waterway, a height of the third separation plate is approximately one half of the height of the waterway, and the height of the fourth separation plate is approximately three fourths of the height of the waterway.

27. The apparatus of claim 1, wherein a gate is provided between each region and each coupled water storage.

28. The apparatus of claim 27, wherein a slant separation plate is provided below each water storage for separating the waste from dirty water which flowed to a bottom of the waterway for being further drained.

29. The apparatus of claim 27, wherein a movable pusher is provided in each water storage for pushing the waste stored therein to a conveyor.

30. The apparatus of claim 1, wherein a ripper is provided at the fifth region located at the end of the waterway for pushing the waste to the water storage of the fifth region.

31. The apparatus of claim 1, wherein the waterway is a double waterway configuration.

* * * * *